(12) United States Patent
Carney

(10) Patent No.: US 10,882,442 B2
(45) Date of Patent: Jan. 5, 2021

(54) ILLUMINATED SPARE TIRE COVER

(71) Applicant: Rebecca Carney, Medford Lakes, NJ (US)

(72) Inventor: Rebecca Carney, Medford Lakes, NJ (US)

(*) Notice: Subject to any disclaimer, the term of this patent is extended or adjusted under 35 U.S.C. 154(b) by 0 days.

(21) Appl. No.: 16/451,153

(22) Filed: Jun. 25, 2019

(65) Prior Publication Data

US 2020/0001771 A1   Jan. 2, 2020

Related U.S. Application Data

(60) Provisional application No. 62/690,487, filed on Jun. 27, 2018.

(51) Int. Cl.
| | | |
|---|---|---|
| *B60Q 1/26* | (2006.01) | |
| *B60Q 1/00* | (2006.01) | |
| *B62D 43/00* | (2006.01) | |
| *F21V 21/08* | (2006.01) | |
| *F21V 23/06* | (2006.01) | |

(52) U.S. Cl.
CPC ......... *B60Q 1/0017* (2013.01); *B60Q 1/0088* (2013.01); *B60Q 1/2661* (2013.01); *B62D 43/005* (2013.01); *F21V 21/0832* (2013.01); *F21V 23/06* (2013.01)

(58) Field of Classification Search
CPC .......................... B62D 43/005; B60Q 1/2661
See application file for complete search history.

(56) References Cited

U.S. PATENT DOCUMENTS

| | | | | |
|---|---|---|---|---|
| 1,724,281 A | * | 8/1929 | Hathorn | G09F 21/045 40/579 |
| 2016/0015102 A1 | * | 1/2016 | Fonte | A41D 1/002 362/108 |

* cited by examiner

*Primary Examiner* — Sean P Gramling
(74) *Attorney, Agent, or Firm* — Stuart M. Goldstein

(57) ABSTRACT

An illuminated spare tire cover, designed to enclose an externally mounted spare tire, has an outer covering with a plurality of grommeted openings therethrough. The openings form a pattern. An electric light is located within each opening, such that a lighted image is created through the pattern when the lights are illuminated. Strips of Velcro® hold the lights in place. The lights can be configured as various images, logos, symbols, lettering, etc. An internal layer made of non-flammable material fits over the interior surface of the outer covering to insulate and support the cover and reinforce the lights located within the interior surface of the outer covering. The cover is equipped with electrical wiring and an electrical connector plug. An extension cord is connected to the vehicle's electrical outlet and run under the vehicle's seats to be connected to the electric connector plug.

4 Claims, 4 Drawing Sheets

ILLUMINATED SPARE TIRE COVER

This application claims the benefit of provisional application Ser. No. 62/690,487, filed on Jun. 27, 2018.

BACKGROUND THE INVENTION

Many motor vehicles, especially sport utility vehicles like the Jeep,® have their spare tires secured to an external frame on the back of the vehicle. These covers often have drawings, images, sayings, slogans, logos, or other designs, most of which cannot be seen at night. Reflective materials are sometimes used in an attempt to see these designs when it is dark. However, such material must have a light shining on them to be seen and they are usually not weather resistant. As a result, they peel and crack and lose their reflectivity or visibility.

Attempts to electrically illuminate spare tire covers or tires themselves present their own problems. Covers with batteries are cumbersome. Covers with weaker batteries lose their power quickly, making it difficult to have a cover illuminated for any length of time. Stringing lights directly on a spare tire results in the same problems. Additionally, external lighting must be taken off the tire when the vehicle is being washed or when there is bad weather.

SUMMARY OF THE INVENTION

It is thus the object of the invention to provide an illuminated spare tire cover which overcomes the limitations and disadvantages of prior covers and spare tire lighting techniques.

This and other objects are accomplished by the present invention, an illuminated spare tire cover configured to enclose an externally mounted vehicle spare tire. The cover has an outer covering with a plurality of grommeted openings therethrough. The openings form a pattern. An electric light is located within each opening, such that a lighted image is created through the pattern when the lights are illuminated. Strips of Velcro® or other attachment means hold the lights in place. The lights can be configured as various images, logos, symbols, lettering, etc. An internal layer made of non-flammable material fits over the interior surface of the outer covering to insulate and support the cover and reinforce the lights located within the interior surface of the outer covering. The cover is equipped with electrical lines, wiring, and an electrical connector plug. An extension cord is plugged into the vehicle's electrical outlet and run under the vehicle's back seats to be connected to the electric connector plug.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
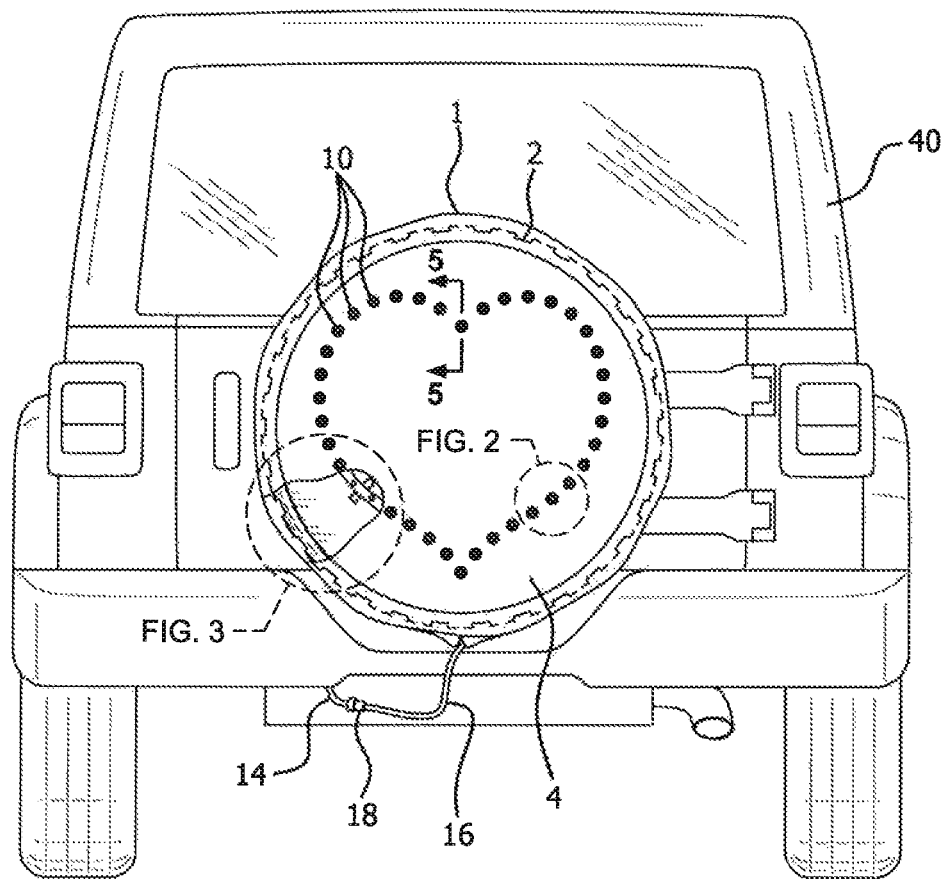
FIG. 1 shows the spare tire cover of the present invention mounted on a spare tire on the rear of a vehicle.
Figure 2:
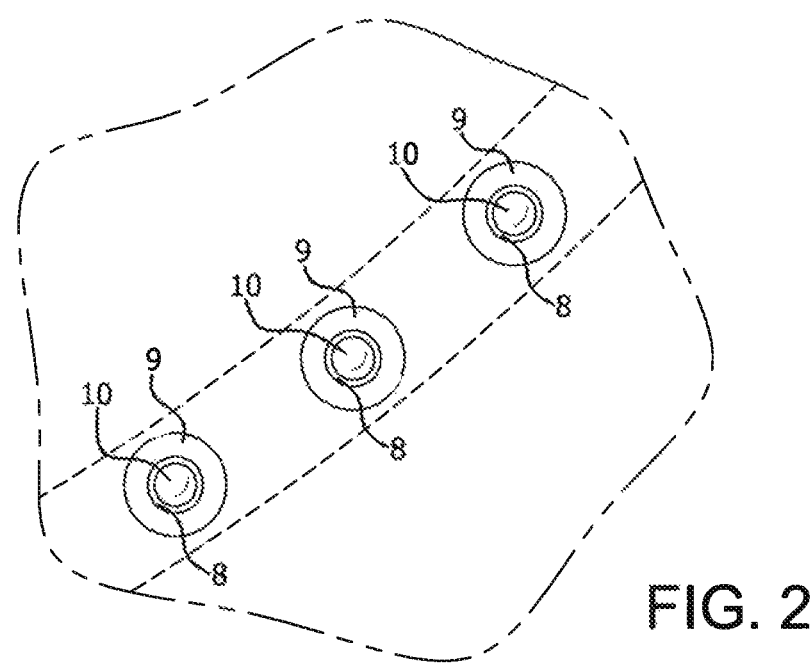
FIG. 2 is a section view of the spare tire cover of the present invention, taken from FIG. 1.

Illuminated spare tire cover 1 of the present invention comprises outer spare tire covering 2 having exterior surface 4 and interior surface 6. Covering 2 is configured to encapsulate spare tire 30, mounted externally on vehicle 40.

Figure 4:
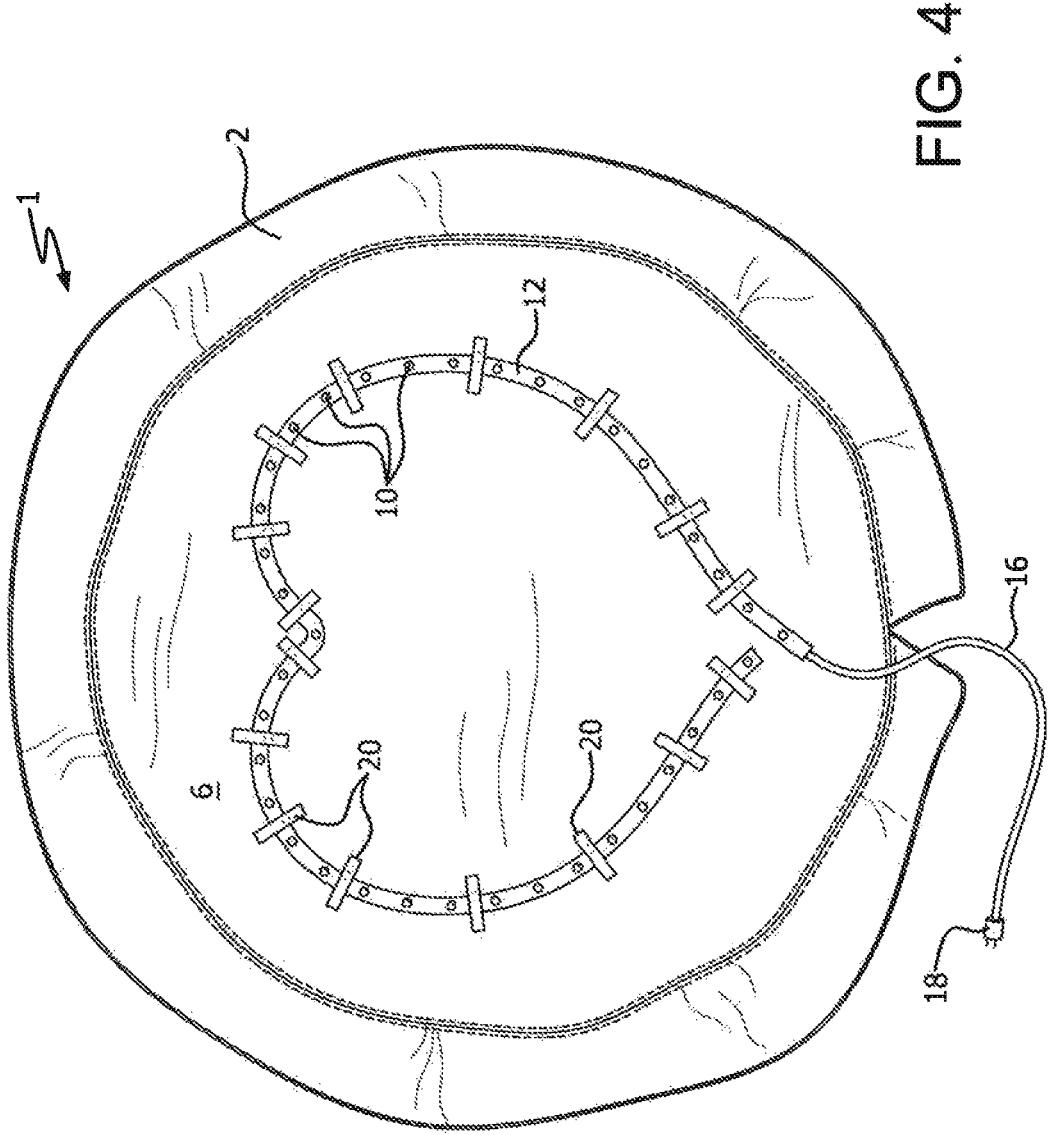
FIG. 4 is a view of the interior surface of the outer covering of the spare tire cover of the present invention.

A plurality of openings 8, reinforced with metal grommets 9, extends between exterior surface 4 and interior surface 6. The plurality of openings forms a pattern through outer covering 2. FIGS. 1 and 4 show a pattern of a heart. However, it is contemplated that any number of patterns, e.g. letters, a flag, a symbol, a logo, etc. can be formed by the openings within outer covering 2, and the present invention is not to be considered to be restricted to the herein disclosure.

A plurality of electric lights 10 is mounted on electric conductive strip 12. One of each of lights 10 are located in one of the openings 8. Each light 10 extends through its respective openings 8, such that the illuminated, lamp section of the light is located outside exterior surface 4 of outer covering 2. Lights 10 can be replaced with most different forms of lighting, including, but not limited to, bulbs mounted in series, Christmas lights, LED lights, neon lights, etc.

Electric conductive means comprises electric conductive strip 12, extending between lights 10 for supplying electricity to the lights, and electrical wire 16 which is connected to the conductive strip and exits outer covering 2, as seen in FIG. 1. Electrical connector plug 18 is located at the terminus of electric wire 16. Attachment means, in the form of hook and loop attachments 20, e.g. Velcro,® secures lights 10 to interior surface 6 of tire covering 2.

Figure 3:
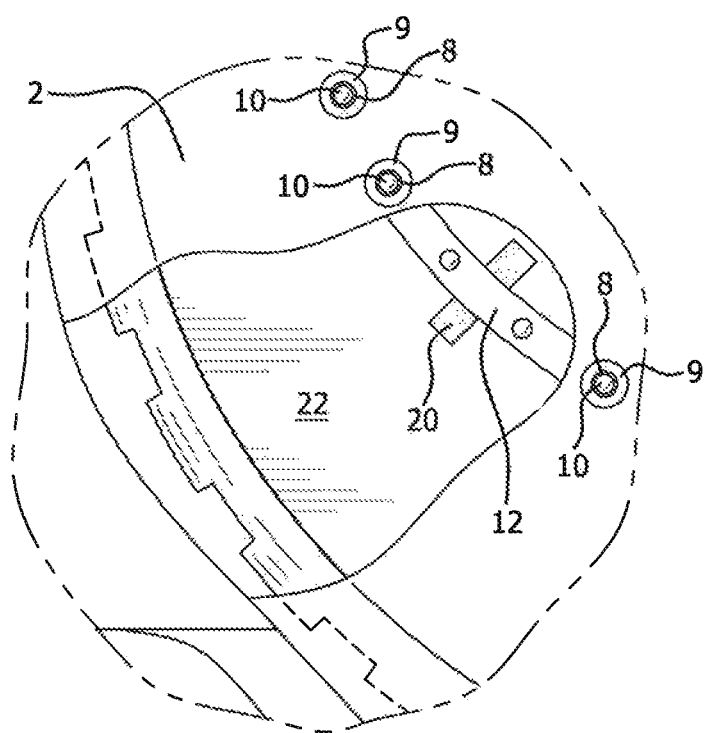
FIG. 3 is a section view of the spare tire cover of the present invention, taken from FIG. 1.
Figure 5:
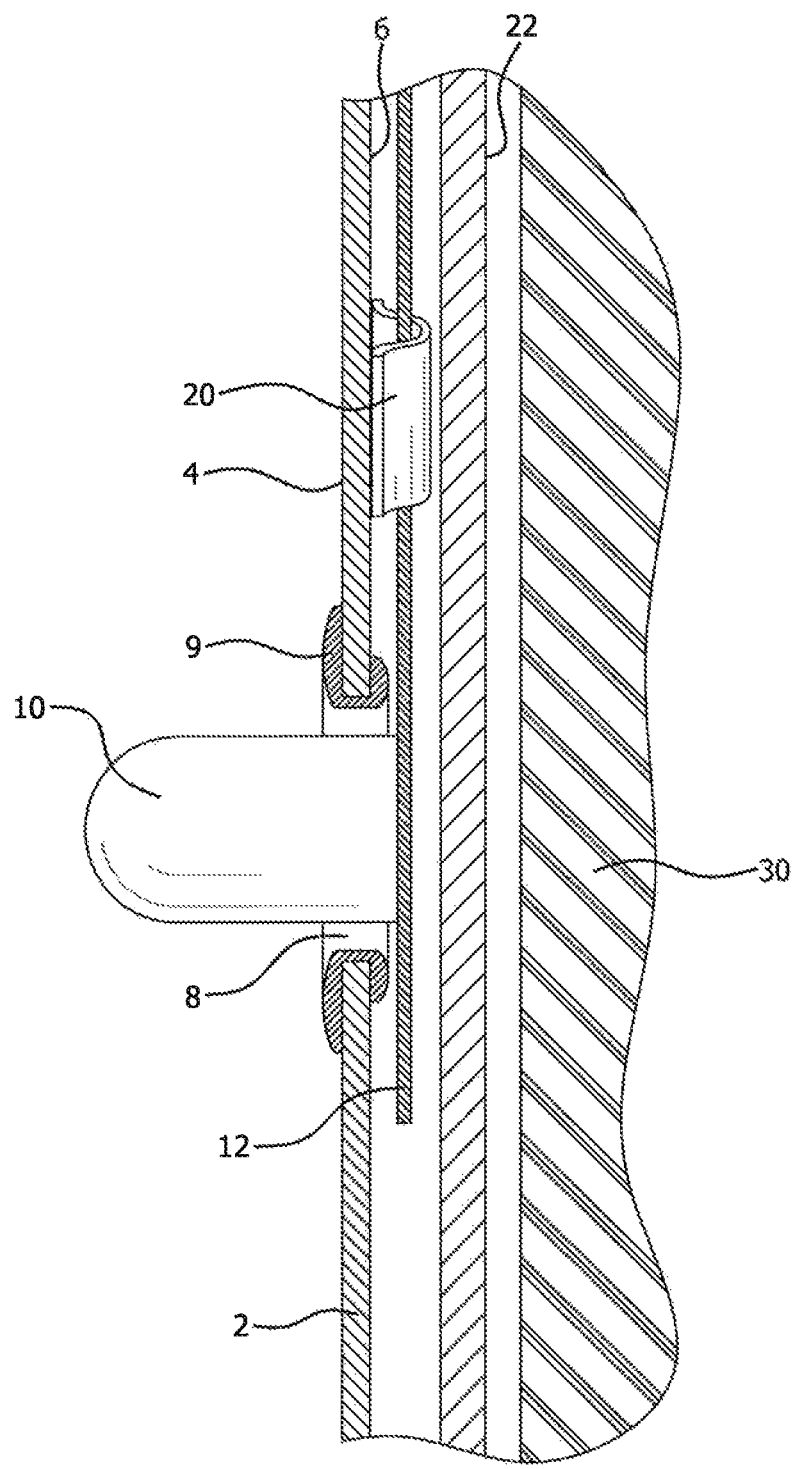
FIG. 5 is a cross-section view of the spare tire cover of the present invention taken from FIG. 1.

Inner layer 22, made of non-flammable material, is substantially the same shape as and extends over interior surface 6, lights 10 and attachments 20, as best seen in FIGS. 3 and 5. Inner layer 22 provides insulation for cover 1 and reinforcement of lights 10 within outer covering 2.

In use, spare tire cover 1 is first positioned over spare tire 30, externally mounted on vehicle 40. Vehicle 40 is equipped with an internal electrical outlet connected to the vehicle's power source, e.g. a battery. Electric extension cord 14 is plugged into the outlet and run under the vehicle's seats and out of the rear of the vehicle, a common practice in the automotive field. Electrical connector plug 18 is plugged into extension cord 14 which exits vehicle 40 (FIG. 1), to illuminate lights 10, creating a fully lighted image through the pattern formed in outer covering 2.

In wet weather or when vehicle 40 is going to be washed, plug 18 is simply disconnected from the vehicle's extension cord and cover 1 removed. However, the cover is waterproof, so it can remain on the tire during inclement weather.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A removable, illuminated tire cover for spare tires which are externally mounted on a vehicle, said tire cover comprising:

an outer spare tire covering having exterior and interior surfaces, a plurality of openings extending between the exterior and interior surfaces through the outer covering, the openings forming a pattern through the outer covering;

a plurality of electrical lights each of the plurality of lights being circumscribed with reinforcing grommets, one of each of the plurality of electrical lights being located in one of the plurality of openings, said plurality of lights extending through the openings such that the lights are located outside the exterior surface of the outer covering;

electric conductive means comprising an electric conductive strip on which the plurality of lights are mounted, the conductive strip extending between the plurality of lights for supplying electricity to said plurality of lights, said conductive means further comprising an electric wire extending outside the tire cover, and an electrical connector plug located outside the tire cover at the terminus of the electric wire;

an inner layer of non-flammable material extending over the interior surface of the outer covering for providing insulation and reinforcement of the plurality of lights within the outer covering; and attachment means located between the outer covering and the inner layer for securing the electric conductive strip and the plurality of lights mounted thereon to the interior surface of the outer covering, said attachment means comprising a series of hook and loop strips affixed directly to the interior surface of the covering, said hook and loop strips being spaced apart along and surrounding the electric conductive strip;

wherein when the connector plug is attached to an electrical power source in the vehicle, the plurality of lights are lit up, creating a lighted image through the pattern formed through the outer covering.

2. The illuminated tire cover as in claim 1 wherein when the connector plug is detached from the electrical power source, the cover is removable from the spare tire.

3. The illuminated tire cover as in claim 1 wherein the inner layer has the same shape as the interior surface of the outer covering.

4. The illuminated tire cover as in claim 1 wherein the attachment means comprises a hook and loop attachment.

* * * * *